US009565009B2

(12) United States Patent
Nishikawa

(10) Patent No.: US 9,565,009 B2
(45) Date of Patent: Feb. 7, 2017

(54) COMMUNICATION APPARATUS AND COMMUNICATION METHOD

(71) Applicant: NEC Corporation, Tokyo (JP)

(72) Inventor: Yoshiaki Nishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 43 days.

(21) Appl. No.: 14/404,274

(22) PCT Filed: Apr. 17, 2013

(86) PCT No.: PCT/JP2013/002591
§ 371 (c)(1),
(2) Date: Nov. 26, 2014

(87) PCT Pub. No.: WO2013/179554
PCT Pub. Date: Dec. 5, 2013

(65) Prior Publication Data
US 2015/0146636 A1 May 28, 2015

(30) Foreign Application Priority Data
May 30, 2012 (JP) ................................. 2012-122746

(51) Int. Cl.
H04L 5/00 (2006.01)
H04L 29/06 (2006.01)
H04L 1/08 (2006.01)
(52) U.S. Cl.
CPC ............... *H04L 5/0058* (2013.01); *H04L 1/08* (2013.01); *H04L 69/16* (2013.01)
(58) Field of Classification Search
None
See application file for complete search history.

(56) References Cited

U.S. PATENT DOCUMENTS

2004/0085903 A1* 5/2004 Matsumoto ............. H04L 47/10
370/235
2004/0264370 A1* 12/2004 Moon ..................... H04L 47/10
370/229

(Continued)

FOREIGN PATENT DOCUMENTS

JP 2005-167352 6/2005
JP 4542150 9/2010
WO WO 2007/043373 A1 4/2007

OTHER PUBLICATIONS

International Search Report and Written Opinion of ISA mailed Jun. 18, 2013 in corresponding PCT International Application.

*Primary Examiner* — Diane Lo
(74) *Attorney, Agent, or Firm* — Finnegan, Henderson, Farabow, Garrett & Dunner, L.L.P.

(57) ABSTRACT

A communication apparatus includes: a transmission unit including a narrow interval data transmission unit which transmits a predetermined plurality of sets of data at an interval narrower than a predetermined interval, upon receipt of a narrow interval data transmission instruction; and a reception unit including: a transmission data reception unit which receives data of an application of a communication partner, and issuing a notification each time the data is received; a data transmission interval reception unit which receives a time interval of data transmission from the communication partner; a data non-arrival detection unit which considers data not to be arrived, in the case where the notification has not been issued from the transmission data reception unit for a predetermined time period longer than the time interval received by the data transmission interval reception unit; and a narrow interval data transmission instruction unit which transmits a narrow interval data transmission instruction to the communication partner, when (Continued)

the data non-arrival detection unit considers data not to be arrived.

7 Claims, 5 Drawing Sheets

(56) References Cited

U.S. PATENT DOCUMENTS

| | | | |
|---|---|---|---|
| 2007/0223492 A1* | 9/2007 | Lee | H04W 28/18 370/395.52 |
| 2009/0268747 A1 | 10/2009 | Kurata et al. | |
| 2009/0323527 A1* | 12/2009 | Accapadi | H04L 1/1841 370/235 |
| 2013/0297774 A1* | 11/2013 | Pope | H04L 47/286 709/224 |

\* cited by examiner

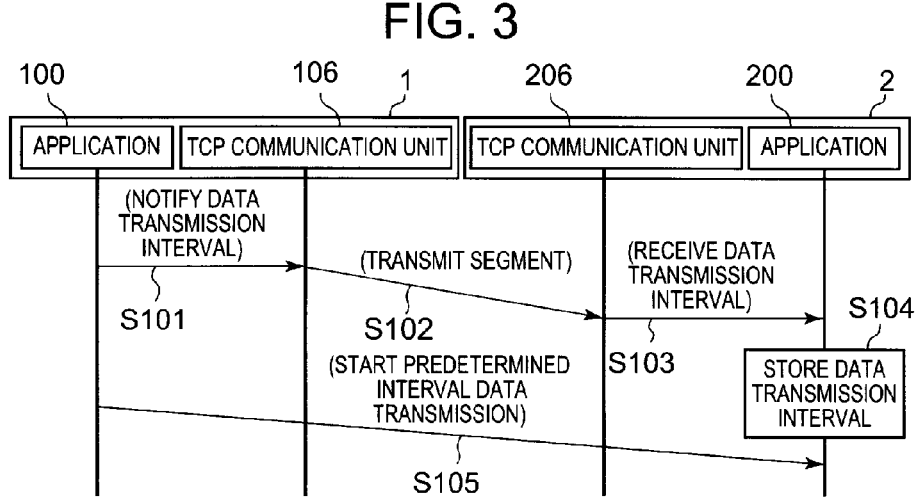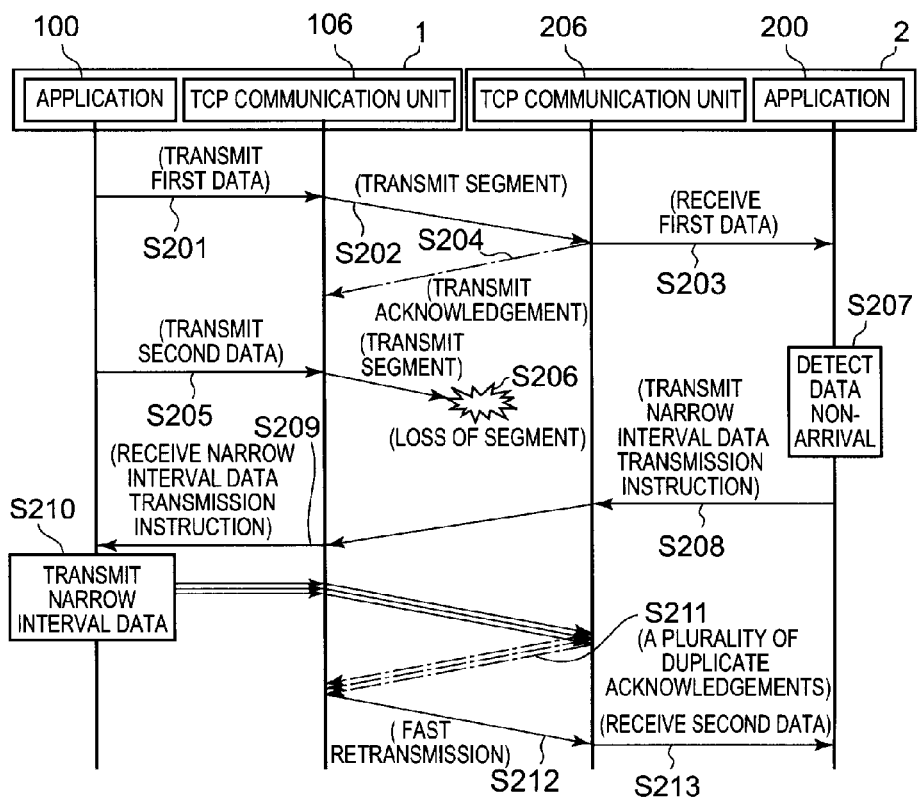

COMMUNICATION APPARATUS AND COMMUNICATION METHOD

CROSS-REFERENCE TO RELATED PATENT APPLICATIONS

This application is a National Stage Entry of International Application No. PCT/JP2013/002591, filed Apr. 17, 2013, which claims priority from Japanese Patent Application No. 2012-122746, filed May 30, 2012. The entire contents of the above-referenced applications are expressly incorporated herein by reference.

TECHNICAL FIELD

The present invention relates to a communication apparatus and a communication method for performing TCP communication, and especially relates to a communication apparatus and a communication method that can reduce a delay time due to retransmission which uses duplicate acknowledgements.

BACKGROUND ART

The Transmission Control Protocol (TCP) is widely used as a standard protocol for data communication via a network. TCP has a function of passing a sequence of data passed from a higher layer, to a lower layer per unit of transmission called "segment". TCP also has a function of rearranging, in transmission order, a sequence of data passed from the lower layer, and passing the data to the higher layer.

In TCP, fast retransmission control using duplicate acknowledgements is available. A duplicate acknowledgement is an acknowledgement for notifying that a segment has not arrived at a receiver terminal due to, for example, packet loss or discarding as a result of error detection in the lower layer. Immediately upon receiving a segment transmitted after the segment that has not arrived, the receiver terminal transmits a duplicate acknowledgement to the transmitter. In the case where the transmitter communication terminal, which executes fast retransmission control, receives a plurality of duplicate acknowledgements, the transmitter communication terminal performs retransmission control for the segment notified as not having arrived at the receiver terminal. Usually, the transmitter terminal performs retransmission control in the case of receiving three duplicate acknowledgements.

Patent Literature (PTL) 1 describes the following technique for reducing a delay time due to retransmission: a transmitter terminal transmits forcible retransmission data beforehand on the assumption that transmission data might not arrive at a receiver terminal or might incorrectly arrive at the receiver terminal.

CITATION LIST

Patent Literature

PTL 1: Japanese Patent No. 4542150

SUMMARY OF INVENTION

Technical Problem

However, a delay time due to retransmission cannot be reduced in the case where the TCP layer is hidden from an application, for the following reason. For example when the size of data transmitted from an application is smaller than one segment, a plurality of duplicate acknowledgements are not generated even in the case where the transmitter application transmits forcible retransmission data beforehand. Accordingly, the retransmission of the data transmitted earlier is not performed, and so the data transmitted earlier does not arrive at a receiver application.

The present invention has an object of reducing a delay time due to retransmission even in the case where the TCP layer is hidden from an application.

Solution to Problem

A communication apparatus according to the present invention includes: a transmission unit including: a predetermined interval data transmission unit which transmits data at a predetermined interval; and a narrow interval data transmission unit which transmits a predetermined plurality of sets of data at an interval narrower than the predetermined interval, upon receipt of a narrow interval data transmission instruction; and a reception unit including: a transmission data reception unit which receives data of an application of the communication partner, and issuing a notification each time the data is received; a data transmission interval reception unit which receives a time interval of data transmission from the communication partner; a data non-arrival detection unit which considers data not to be arrived, in the case where the notification has not been issued from the transmission data reception unit for a predetermined time period longer than the time interval received by the data transmission interval reception unit; and a narrow interval data transmission instruction unit which transmits a narrow interval data transmission instruction to the communication partner, when the data non-arrival detection unit considers data not to be arrived.

A communication apparatus according to another aspect of the present invention includes: a transmission unit including: a transmission unit including: a predetermined interval data transmission unit which transmits data at a predetermined interval; and a narrow interval data transmission unit which transmits a predetermined plurality of sets of data at an interval narrower than the predetermined interval, upon receipt of a narrow interval data transmission instruction; and a reception unit including: a transmission data reception unit which receives data of an application of a communication partner, and issuing a notification each time the data is received; a data reception interval calculation unit which decides a time interval for detecting data non-arrival, from an interval at which the transmission data reception unit receives data; a data non-arrival detection unit which considers data not to be arrived, in the case where the notification has not been issued from the transmission data reception unit for a predetermined time period longer than the time interval decided by the data reception interval calculation unit; and a narrow interval data transmission instruction which transmits a narrow interval data transmission instruction to the communication partner, when the data non-arrival detection unit considers data not to be arrived.

A communication method according to the present invention includes: transmitting data at a predetermined interval; notifying a communication partner of a time interval of data transmission; transmitting a predetermined plurality of sets of data at an interval narrower than the predetermined interval, upon receipt of a narrow interval data transmission instruction; and considering data not to be arrived and transmitting a narrow interval data transmission instruction to the communication partner, in the case where data has not been received from a communication partner for a predetermined time period longer than a time interval of data transmission received from the communication partner.

A communication method according to another aspect of the present invention includes: transmitting data at a predetermined interval; transmitting a predetermined plurality of sets of data at an interval narrower than the predetermined interval, upon receipt of a narrow interval data transmission instruction; deciding a time interval for detecting data non-arrival, from an interval at which data is received from a communication partner; and considering data not to be arrived and transmitting a narrow interval data transmission instruction to the communication partner, in the case where data has not been received from the communication partner for a predetermined time period longer than the time interval.

Advantageous Effects of Invention

A delay time due to retransmission can be reduced in the case where the TCP layer is hidden from a transmitter application.

BRIEF DESCRIPTION OF DRAWINGS

FIG. 3 It is a flowchart depicting an operation in Exemplary Embodiment 1.

FIG. 4 It is a flowchart depicting an operation in Exemplary Embodiment 1.

DESCRIPTION OF EMBODIMENTS

Figure 1:
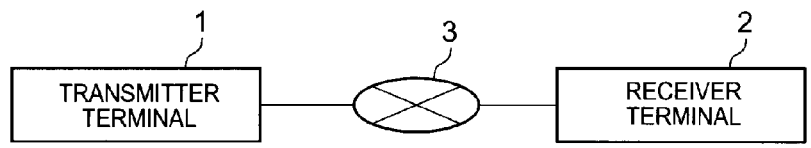
FIG. 1 It is a block diagram depicting a transmitter terminal and a receiver terminal.

FIG. 1 is a block diagram depicting a transmitter terminal and a receiver terminal. A transmitter terminal 1 and a receiver terminal 2 can communicate with each other via a network 3. The transmitter terminal 1 is a terminal capable of TCP communication with the receiver terminal 2. Each of the transmitter terminal 1 and the receiver terminal 2 is a personal computer (PC) or a mobile terminal.

Exemplary Embodiment 1

Figure 2:
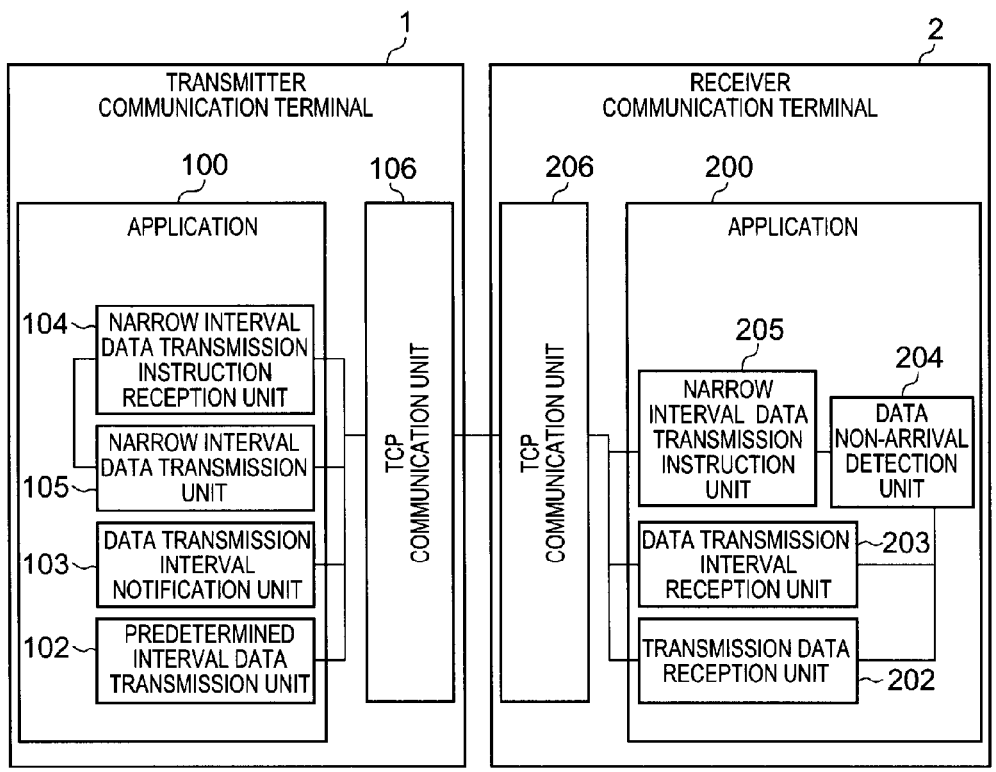
FIG. 2 It is a block diagram depicting structures of a transmitter communication terminal and a receiver communication terminal in a communication system in Exemplary Embodiment 1.

FIG. 2 is a block diagram depicting structures of a transmitter communication terminal and a receiver communication terminal in a communication system in Exemplary Embodiment 1. As depicted in FIG. 2, the transmitter communication terminal 1 includes an application 100 and a TCP communication unit 106. The application 100 is an application in a higher layer than TCP. The application 100 includes a predetermined interval data transmission unit 102, a data transmission interval notification unit 103, a narrow interval data transmission instruction reception unit 104, and a narrow interval data transmission unit 105.

The predetermined interval data transmission unit 102 transmits data to an application in the receiver communication terminal 2 via the TCP communication unit 106, at a predetermined time interval. The data transmission interval notification unit 103 transmits the time interval of data transmission by the predetermined interval data transmission unit 102, to the application in the receiver communication terminal 2 via the TCP communication unit 106.

The narrow interval data transmission instruction reception unit 104 receives a narrow interval data transmission instruction transmitted from the application in the receiver communication terminal 2. The narrow interval data transmission unit 105 transmits a plurality of sets of data to the application in the receiver communication terminal 2 via the TCP communication unit 106 at a narrow time interval, in the case where the narrow interval data transmission instruction reception unit 104 receives the narrow interval data transmission instruction.

The narrow time interval is an interval narrower than the interval of data transmission by the predetermined interval data transmission unit 102. A narrower time interval enables faster retransmission control.

The TCP communication unit 106 communicates data, which is communicated by the application 100, with the receiver communication terminal 2 according to the protocol of TCP.

The receiver communication terminal 2 includes an application 200 and a TCP communication unit 206. The application 200 is an application in a higher layer than TCP. The application 200 includes a transmission data reception unit 202, a data transmission interval reception unit 203, a data non-arrival detection unit 204, and a narrow interval data transmission instruction unit 205.

The transmission data reception unit 202 receives data transmitted at the predetermined interval, via the TCP communication unit 206. Each time the transmission data reception unit 202 receives data, the transmission data reception unit 202 notifies the data non-arrival detection unit 204. The data transmission interval reception unit 203 receives the data transmission interval transmitted from the data transmission interval notification unit 103, via the TCP communication unit 206.

The data non-arrival detection unit 204 holds the data transmission interval received by the data transmission interval reception unit 203. The data non-arrival detection unit 204 detects data non-arrival. The data non-arrival detection unit 204 determines that data has not arrived, in the case where the notification of data reception has not been issued from the transmission data reception unit 202 for a time period sufficiently longer than the held data transmission interval. The time period sufficiently longer than the data transmission interval is a predetermined time period appropriate to determine that data has not arrived.

The narrow interval data transmission instruction unit 205 transmits the narrow interval data transmission instruction to the application in the transmitter communication terminal 1 via the TCP communication unit 206, when the data non-arrival detection unit 204 detects data non-arrival.

The TCP communication unit 206 communicates data, which is communicated by the application 200, with the transmitter communication terminal 1 according to the protocol of TCP.

An operation of the communication system is described below, with reference to flowcharts in FIGS. 3 and 4.

Suppose the transmitter communication terminal 1 and the receiver communication terminal 2 have established a TCP connection via the TCP communication unit 106 and the TCP communication unit 206.

As depicted in FIG. 3, the transmitter communication terminal 1 notifies the application 200 of the data transmission interval, before data transmission (step S101). The data transmission interval is segmented according to the protocol of TCP, and transmitted to the TCP communication unit 206 (step S102).

The segment received by the TCP communication unit 206 is decoded according to the data transmission interval, and received by the data transmission interval reception unit 203 in the application 200 (step S103). The data non-arrival detection unit 204 holds the data transmission interval (step S104). After this, data is transmitted from the predetermined interval data transmission unit 102 to the transmission data reception unit 202 via the TCP communication unit 106 and the TCP communication unit 206, at the predetermined time interval (step S105).

As depicted in FIG. 4, the predetermined interval data transmission unit 102 transmits first data (step S201). The first data is segmented and transmitted to the TCP communication unit 206 (step S202). The first data is received by the TCP communication unit 206, and then received by the transmission data reception unit 202 (step S203). At the same time, an acknowledgement is transmitted from the TCP communication unit 206 to the TCP communication unit 106 (step S204).

The predetermined interval data transmission unit 102 transmits second data, after the predetermined time interval from the transmission of the first data (step S205). The second data is segmented and transmitted to the TCP communication unit 206. In the example depicted in FIG. 4, the segment of the second data is lost due to packet loss on the communication path, so that the TCP communication unit 206 is unable to receive the segment of the second data (step S206).

The data non-arrival detection unit 204 determines that data has not arrived, in the case where the transmission data reception unit 202 has not received data from the time of reception of the first data for the time period sufficiently longer than the held data transmission interval (step S207). When data non-arrival is detected, the narrow interval data transmission instruction unit 205 transmits the narrow interval data transmission instruction (step S208).

The narrow interval data transmission instruction is segmented and transmitted to the transmitter communication terminal 1. The application 100 receives the decoded narrow interval data transmission instruction (step S209). When the narrow interval data transmission instruction is received, the narrow interval data transmission unit 105 in the application 100 transmits three sets of data at the time interval sufficiently narrower than the data transmission interval of the predetermined interval data transmission unit 102 (step S210). The three sets of data are each segmented and received by the TCP communication unit 206. Since the TCP communication unit 206 receives the data succeeding the second data before receiving the segment of the second data, the TCP communication unit 206 transmits a duplicate acknowledgement for each of the three segments (step S211).

Upon receiving three duplicate acknowledgements, the TCP communication unit 106 performs fast retransmission control for the segment corresponding to the second data according to the protocol of TCP (step S212). The TCP communication unit 206 decodes the retransmission segment, and the application 200 receives the second data (step S213).

This exemplary embodiment has an advantageous effect of reducing a delay time due to retransmission in the case where the TCP layer is hidden from an application.

In this exemplary embodiment, the TCP communication unit 106 starts fast retransmission control upon receiving three duplicate acknowledgements. Accordingly, the narrow interval data transmission unit 105 transmits three sets of narrow interval data in the process of step S210.

However, the number of sets of narrow interval data is not limited to three. The number of sets of narrow interval data varies depending on the number of duplicate acknowledgements necessary to start fast retransmission control of the protocol of TCP implemented in the transmitter communication terminal 1.

Exemplary Embodiment 2

Figure 5:
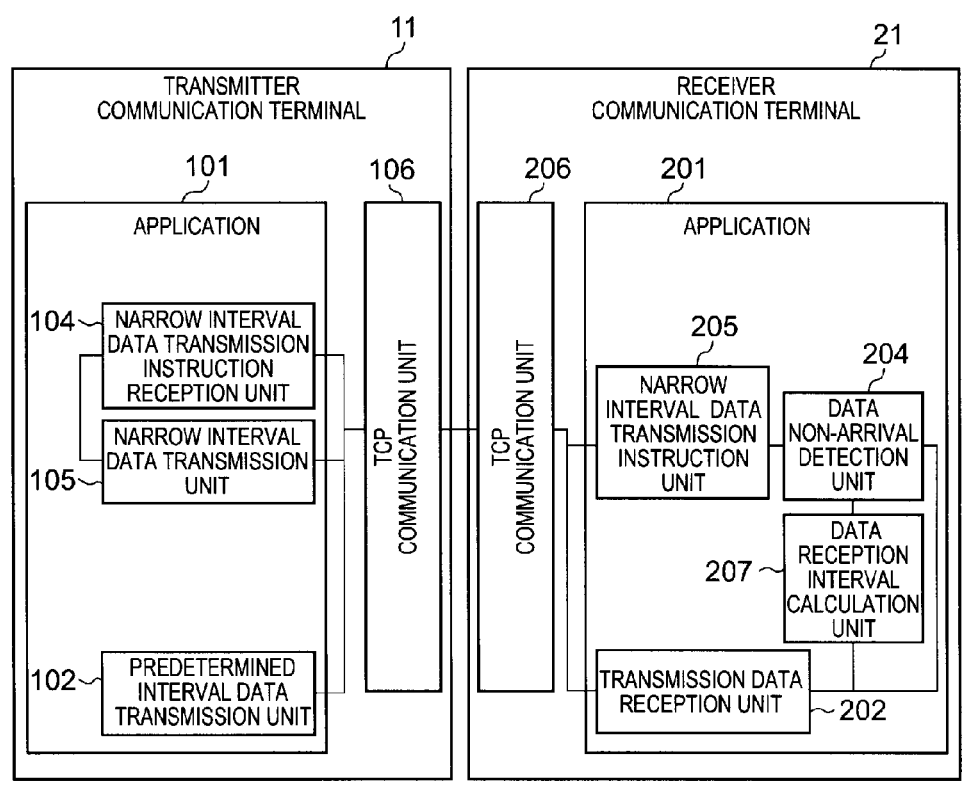
FIG. 5 It is a block diagram depicting structures of a transmitter communication terminal and a receiver communication terminal in a communication system in Exemplary Embodiment 2.

FIG. 5 is a block diagram depicting structures of a transmitter communication terminal and a receiver communication terminal in a communication system in Exemplary Embodiment 2. As depicted in FIG. 2, in Exemplary Embodiment 2, an application 101 in a transmitter communication terminal 11 does not include the data transmission interval notification unit 103 in Exemplary Embodiment 1, and an application 201 in a receiver communication terminal 21 does not include the data transmission interval reception unit 203 in Exemplary Embodiment 1. The application 201 includes a data reception interval calculation unit 207.

The data reception interval calculation unit 207 sequentially holds each time interval at which the transmission data reception unit 202 receives data, and calculates a mean value and a standard deviation of the time intervals. The data reception interval calculation unit 207 decides a time interval for detecting data non-arrival, from the calculated mean value and standard deviation. The data reception interval calculation unit 207 notifies the data non-arrival detection unit of the decided time interval.

The data non-arrival detection unit determines that data has not arrived, in the case where the notification of data reception has not been issued from the transmission data reception unit 202 for a time period longer than the time interval calculated by the data reception interval calculation unit 207.

The data reception interval calculation unit 207 may calculate, instead of the mean value and the standard deviation, a statistical value such as a median value or a mode value, and decide the time interval for detecting data non-arrival from the calculated value. Alternatively, the data reception interval calculation unit 207 may estimate, from a reception interval between a plurality of previous sets of data, the next data reception time, and decide the time interval for detecting data non-arrival based on the estimated time.

In Exemplary Embodiment 2, data non-arrival is detected without using the data transmission interval. The step of notifying the data transmission interval can thus be omitted, contributing to a shorter time to start data communication.

Example 1

The following describes a specific example of Exemplary Embodiment 1. In this example, each communication terminal is assumed to be a communication terminal including a central processing unit (CPU), a memory, a storage device, and a network connection function.

The receiver communication terminal 2 listens to a port number "12345". The transmitter communication terminal 1 requests a TCP connection to the port number "12345" of the receiver communication terminal 2.

After the connection for TCP communication is established between the transmitter communication terminal 1 and the receiver communication terminal 2, the transmitter communication terminal 1 first notifies "30 milliseconds" as the data transmission interval. The transmitter communication terminal 1 then transmits a character string "1" to the receiver communication terminal 2. Subsequently, the transmitter communication terminal 1 transmits a character string, the value of which is incremented at each transmission as "2", "3", to the receiver communication terminal 2 every 30 milliseconds.

When transmitting the character string "1", the transmitter communication terminal 1 segments the character string "1" and transmits it to the application 200 in the receiver communication terminal 2. Following this, the transmitter communication terminal 1 transmits a character string "12". In the case where the receiver communication terminal 2 has not received the character string "12" 40 milliseconds after receiving the character string "11", the receiver communication terminal 2 transmits a character string "run-11" as the narrow interval data transmission instruction.

40 milliseconds are calculated by adding an appropriate time, i.e. 10 milliseconds, to the notified interval of 30 milliseconds.

Upon receiving the character string "run-11", the transmitter communication terminal 1 transmits a character string "-run-11" every 1 millisecond, three times. Upon receiving the segment corresponding to the character string "-run-11", the TCP communication unit in the receiver communication terminal 2 automatically transmits a duplicate acknowledgement to the transmitter communication terminal in the case where the segment corresponding to the character string "12" has not been received.

The transmitter communication terminal 1 receives three duplicate acknowledgements corresponding to the character string "-run-11". The transmitter communication terminal 1 accordingly starts fast retransmission control of the protocol of TCP, to retransmit the segment corresponding to the character string "12". The receiver communication terminal 2 receives the retransmitted character string "12".

Example 2

The following describes a specific example of Exemplary Embodiment 2. The difference from Example 1 is mainly described below.

As in Example 1, the character string "1" is received by the application 201 in the receiver communication terminal 21. When the character string "2" is received next, a time "32 milliseconds" from when the character string "1" is received to when the character string "2" is received is held in a storage area in the application in the receiver communication terminal 21.

Subsequently, each time the receiver communication terminal 21 receives a character string, the receiver communication terminal 21 stores a time from when a preceding character string is received. Moreover, each time the receiver communication terminal 21 receives a character string, the receiver communication terminal 21 calculates a mean value and a standard deviation of time intervals at which each character string is received. The receiver communication terminal 21 detects data non-arrival, in the case where the receiver communication terminal 21 has not received data for a time period longer than a time interval equivalent to the sum of the calculated mean value and standard deviation.

Though the transmitter communication terminal and the receiver communication terminal are separate apparatuses in each of the above embodiments, the functions of both the transmitter communication terminal and the receiver communication terminal may be included in a communication apparatus.

Figure 6:
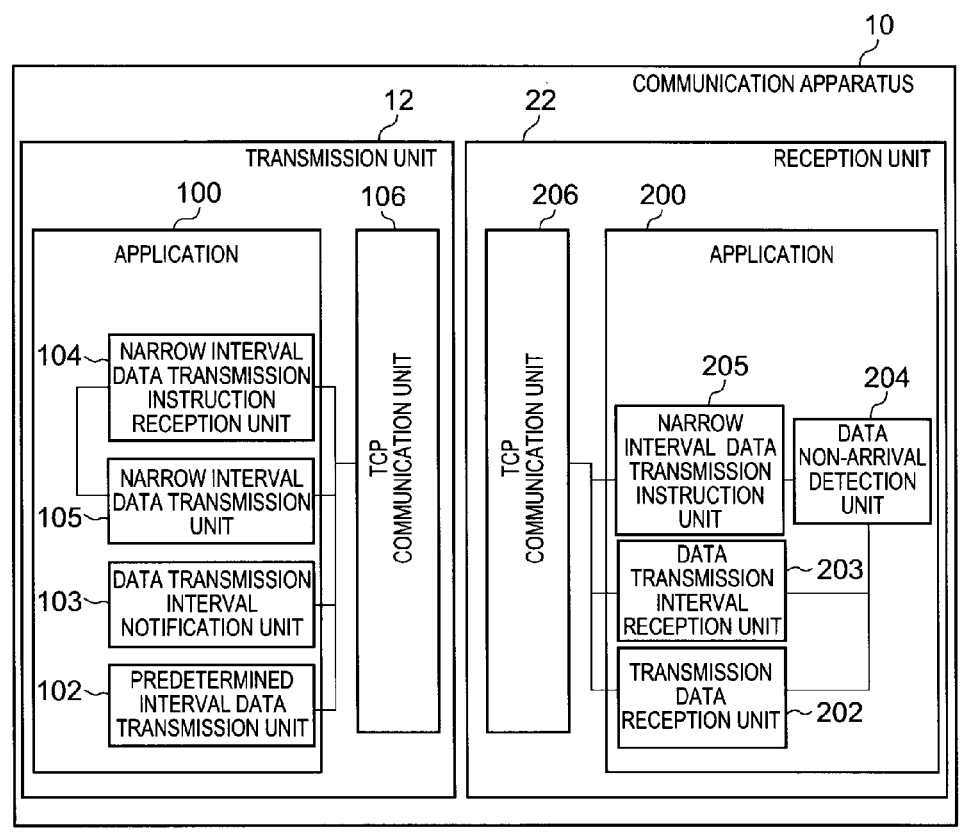
FIG. 6 It is a block diagram depicting an example of a communication apparatus including functions of both a transmitter communication terminal and a receiver communication terminal.

FIG. 6 is a block diagram depicting an example of a communication apparatus including the functions of both the transmitter communication terminal 1 and the receiver communication terminal 2.

A communication apparatus 10 depicted in FIG. 6 includes a transmission unit 12 and a reception unit 22. The transmission unit 12 has the same structure as the transmitter communication terminal 1 depicted in FIG. 2. The reception unit 22 has the same structure as the receiver communication terminal 2 depicted in FIG. 2.

In detail, the transmission unit 12 includes the application 100 and the TCP communication unit 106. The application 100 includes the predetermined interval data transmission unit 102, the data transmission interval notification unit 103, the narrow interval data transmission instruction reception unit 104, and the narrow interval data transmission unit 105.

The reception unit 22 includes the application 200 and the TCP communication unit 206. The application 200 includes the transmission data reception unit 202, the data transmission interval reception unit 203, the data non-arrival detection unit 204, and the narrow interval data transmission instruction unit 205.

Figure 7:
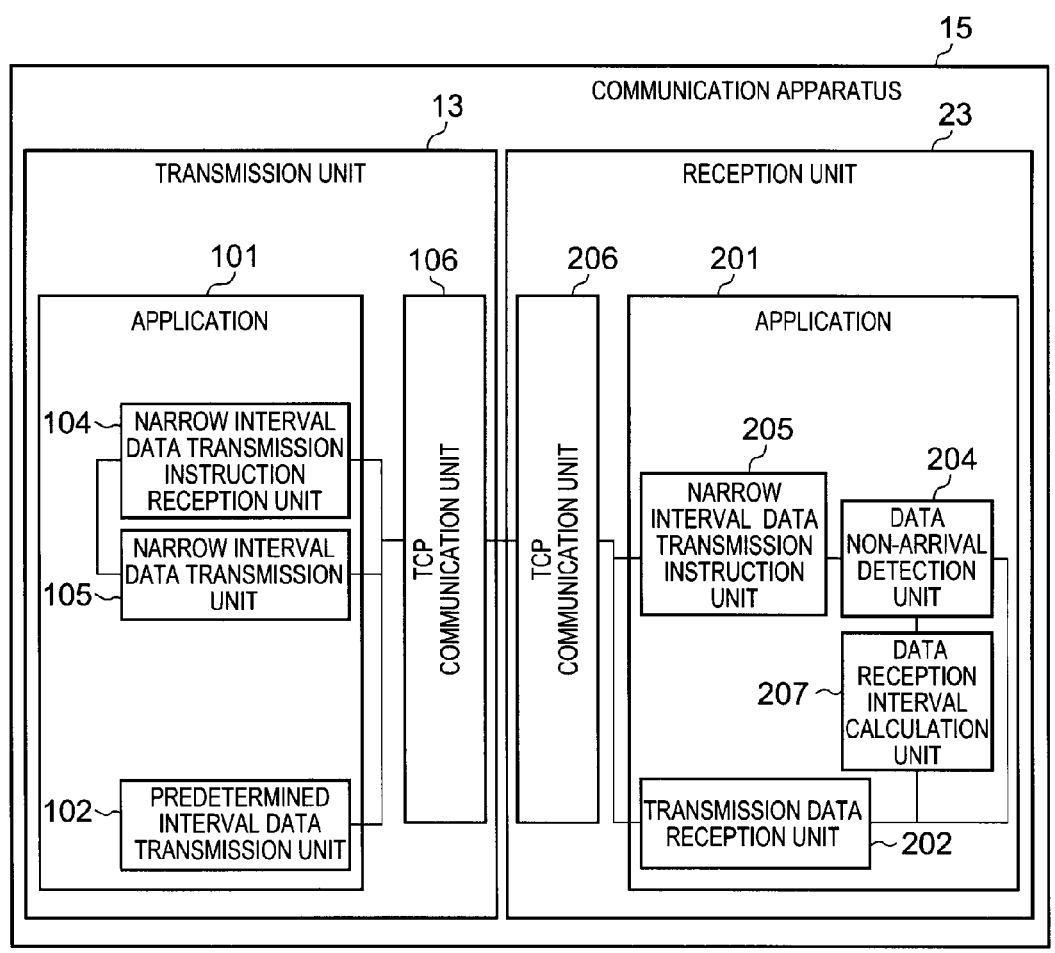
FIG. 7 It is a block diagram depicting another example of a communication apparatus including functions of both a transmitter communication terminal and a receiver communication terminal.

FIG. 7 is a block diagram depicting another example of a communication apparatus including the functions of both the transmitter communication terminal 1 and the receiver communication terminal 2.

A communication apparatus 15 depicted in FIG. 7 includes a transmission unit 13 and a reception unit 23. The transmission unit 13 has the same structure as the transmitter communication terminal 11 depicted in FIG. 5. The reception unit 23 has the same structure as the receiver communication terminal 21 depicted in FIG. 5.

In detail, the transmission unit 13 includes the application 101 and the TCP communication unit 106. The application 101 includes the predetermined interval data transmission unit 102, the narrow interval data transmission instruction reception unit 104, and the narrow interval data transmission unit 105.

The reception unit 23 includes the application 201 and the TCP communication unit 206. The application 201 includes the transmission data reception unit 202, the data non-arrival detection unit 204, the narrow interval data transmission instruction unit 205, and the data reception interval calculation unit 207.

In each of the communication apparatuses depicted in FIGS. 6 and 7, the TCP communication unit 106 and the TCP communication unit 206 may be realized as one TCP communication unit.

Though the present invention has been described with reference to the above exemplary embodiments and examples, the present invention is not limited to the above exemplary embodiments and examples. Various changes understandable by those skilled in the art can be made to the structures and details of the present invention within the scope of the present invention.

This application claims priority based on Japanese Patent Application No. 2012-122746 filed on May 30, 2012, the disclosure of which is incorporated herein in its entirety.

INDUSTRIAL APPLICABILITY

The present invention is applicable to a terminal that synchronizes stably with a terminal in communication.

REFERENCE SIGNS LIST 1, 11, 12, 13 transmitter communication terminal
2, 21, 22, 23 receiver communication terminal
3 network
100, 101 application
102 predetermined interval data transmission unit
103 data transmission interval notification unit
104 narrow interval data transmission instruction reception unit
105 narrow interval data transmission unit
106 TCP communication unit
200, 201 application
202 transmission data reception unit
203 data transmission interval reception unit
204 data non-arrival detection unit
205 narrow interval data transmission instruction unit
206 TCP communication unit
207 data reception interval calculation unit

The invention claimed is:

1. A communication apparatus including a TCP communication unit which relays TCP communication performed by an application, the communication apparatus comprising:
a transmission unit including:
a predetermined interval data transmission unit which transmits data at a predetermined interval;
a data transmission interval notification unit which notifies a communication partner of a time interval of data transmission; and
a narrow interval data transmission unit which transmits a predetermined plurality of sets of data at an interval narrower than the predetermined interval, upon receipt of a narrow interval data transmission instruction; and
a reception unit including:
a transmission data reception unit which receives data of an application of the communication partner, and issuing a notification each time the data is received;
a data transmission interval reception unit which receives a time interval of data transmission from the communication partner;
a data non-arrival detection unit which considers data not to be arrived, in the case where the notification has not been issued from the transmission data reception unit for a predetermined time period longer than the time interval received by the data transmission interval reception unit; and
a narrow interval data transmission instruction unit which transmits a narrow interval data transmission instruction to the communication partner, when the data non-arrival detection unit considers data not to be arrived.

2. The communication apparatus according to claim 1, wherein the narrow interval data transmission unit transmits the sets of data as many as the number of duplicate acknowledgements necessary to start fast retransmission control of TCP.

3. A communication apparatus including a TCP communication unit which relays TCP communication performed by an application, the communication apparatus comprising:
a transmission unit including:
a predetermined interval data transmission unit which transmits data at a predetermined interval; and
a narrow interval data transmission unit which transmits a predetermined plurality of sets of data at an interval narrower than the predetermined interval, upon receipt of a narrow interval data transmission instruction; and
a reception unit including:
a transmission data reception unit which receives data of an application of a communication partner, and issuing a notification each time the data is received;
a data reception interval calculation unit which decides a time interval for detecting data non-arrival, from an interval at which the transmission data reception unit receives data;
a data non-arrival detection unit which considers data not to be arrived, in the case where the notification has not been issued from the transmission data reception unit for a predetermined time period longer than the time interval decided by the data reception interval calculation unit; and
a narrow interval data transmission instruction which transmits a narrow interval data transmission instruction to the communication partner, when the data non-arrival detection unit considers data not to be arrived.

4. The communication apparatus according to claim 3, wherein the data reception interval calculation unit decides the time interval for detecting data non-arrival, using a statistical value of each reception interval between a plurality of sets of data.

5. The communication apparatus according to claim 3, wherein the data reception interval calculation unit estimates a next data arrival time from a data reception interval, and decides the time interval for detecting data non-arrival based on the data arrival time.

6. A communication method performed in a communication apparatus including a TCP communication unit which relays TCP communication performed by an application, the communication method comprising:
transmitting data at a predetermined interval;
notifying a communication partner of a time interval of data transmission;
transmitting a predetermined plurality of sets of data at an interval narrower than the predetermined interval, upon receipt of a narrow interval data transmission instruction; and
considering data not to be arrived and transmitting a narrow interval data transmission instruction to the communication partner, in the case where data has not been received from a communication partner for a predetermined time period longer than a time interval of data transmission received from the communication partner.

7. The communication method according to claim 6, comprising:
transmitting the sets of data as many as the number of duplicate acknowledgements necessary to start fast retransmission control of TCP.

* * * * *